(12) United States Patent
Braude

(10) Patent No.: US 9,141,356 B2
(45) Date of Patent: Sep. 22, 2015

(54) PROCESS FOR GENERATING DYNAMIC TYPE

(75) Inventor: Michael J. Braude, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 13/325,879

(22) Filed: Dec. 14, 2011

(65) Prior Publication Data

US 2013/0159980 A1    Jun. 20, 2013

(51) Int. Cl.
*G06F 9/45* (2006.01)
*G06F 9/455* (2006.01)

(52) U.S. Cl.
CPC ............ *G06F 8/437* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 5,339,430 A | 8/1994 | Lundin et al. |
| 6,044,224 A | 3/2000 | Radia et al. |
| 6,072,953 A | 6/2000 | Cohen et al. |
| 6,282,701 B1 | 8/2001 | Wygodny et al. |
| 6,351,843 B1 | 2/2002 | Berkley et al. |
| 6,779,187 B1 | 8/2004 | Hammond |
| 6,898,788 B2 | 5/2005 | Kosaka et al. |
| 6,957,422 B2 | 10/2005 | Hunt |
| 6,968,540 B2 | 11/2005 | Beck et al. |
| 7,111,279 B2 | 9/2006 | Gazdik et al. |
| 7,117,484 B2 | 10/2006 | Hartman et al. |
| 7,293,260 B1 | 11/2007 | Dmitriev |
| 7,353,507 B2 | 4/2008 | Gazdik et al. |
| 7,370,360 B2 | 5/2008 | van der Made |
| 7,437,715 B2 | 10/2008 | Chatsinchai et al. |
| 7,461,385 B2 | 12/2008 | Winter |
| 7,689,985 B2 | 3/2010 | Callender |
| 7,752,607 B2 | 7/2010 | Larab et al. |
| 7,788,647 B2 | 8/2010 | Martin et al. |
| 7,873,872 B1 | 1/2011 | Shillington et al. |
| 7,873,945 B2 | 1/2011 | Musuvathi et al. |
| 7,900,258 B2 | 3/2011 | van der Made |
| 7,926,042 B2 | 4/2011 | Mehta et al. |
| 7,930,683 B2 | 4/2011 | Li |
| 7,971,090 B2 | 6/2011 | Nan et al. |
| 7,984,429 B2 | 7/2011 | Hunt |
| 8,046,752 B2 * | 10/2011 | Chilimbi et al. .............. 717/158 |
| 8,209,669 B2 | 6/2012 | Schneider et al. |
| 8,225,293 B2 | 7/2012 | Correa |
| 8,234,633 B2 | 7/2012 | Schneider et al. |
| 8,245,194 B2 | 8/2012 | Atkin et al. |
| 8,261,244 B2 | 9/2012 | Pietrek |
| 8,407,678 B2 | 3/2013 | Greene |
| 8,627,296 B1 | 1/2014 | Picard |
| 8,635,582 B2 | 1/2014 | Stellari et al. |

(Continued)

OTHER PUBLICATIONS

Frederick Smith, et al., Title "Compiling for template-based run-time code generation", JFP 13 (3): 677-708, May 2003 Cambridge University Press.*

(Continued)

*Primary Examiner* — Isaac T Tecklu
*Assistant Examiner* — Hossain Morshed
(74) *Attorney, Agent, or Firm* — Kevin Sullivan; Aaron Hoff; Micky Minhas

(57) ABSTRACT

A process for generating dynamic type is disclosed. A compiler generated template method including a mark for custom instruction is selected for cloning. Dynamic code is injected at the mark for the custom instructions. The template method including the injected dynamic code is compiled.

20 Claims, 3 Drawing Sheets

(56) References Cited

U.S. PATENT DOCUMENTS

| | | | |
|---|---|---|---|
| 8,707,265 | B2 | 4/2014 | Li |
| 8,806,437 | B2 | 8/2014 | Arcese et al. |
| 8,954,929 | B2 | 2/2015 | Braude |
| 2002/0049963 | A1 | 4/2002 | Beck et al. |
| 2004/0163077 | A1 | 8/2004 | Dimpsey et al. |
| 2004/0194063 | A1 | 9/2004 | Pereira |
| 2006/0282460 | A1 | 12/2006 | Pandya et al. |
| 2007/0157156 | A1* | 7/2007 | Meier et al. ............... 717/101 |
| 2007/0168998 | A1 | 7/2007 | Mehta et al. |
| 2007/0261044 | A1 | 11/2007 | Clark |
| 2008/0046868 | A1* | 2/2008 | Tsantilis ............... 717/136 |
| 2008/0082959 | A1* | 4/2008 | Fowler ............... 717/104 |
| 2008/0301635 | A1 | 12/2008 | Khan |
| 2009/0007073 | A1 | 1/2009 | Huang et al. |
| 2009/0064113 | A1* | 3/2009 | Langman et al. ............ 717/148 |
| 2009/0144714 | A1 | 6/2009 | Fan et al. |
| 2010/0218172 | A1 | 8/2010 | Randimbivolona |
| 2011/0239194 | A1 | 9/2011 | Braude |
| 2012/0084754 | A1 | 4/2012 | Ziegler et al. |

OTHER PUBLICATIONS

Smith et al., "Compiling for template-based run-time code generation", JFP 13(3): 677-708, May 2003.*

Smith et al., "Compiling for template-based run-time code generation", JFP 13(3) 677-708, May 2003, Cambridge University Press.*

Smith et al., "Compiling for template-based run-time code generation", Retrieved at <<http://loome.cs.uiuc.edu/CS498F10/readings/cyclone.pdf>>, Journal of Functional Programming, vol. 13, Issue 3, May 2003, pp. 677-708.

Bari, et al., "Code Cloning: The Analysis, Detection and Removal", Retrieved at <<http://www.ijcaonline.org/volume20/number7/pxc3873300.pdf>>, International Journal of Computer Applications, vol. 20, No. 7, Apr. 2011, pp. 34-38.

Labrecque, et al., "Custom Code Generation for Soft Processors", Retrieved at <<http://www.eecg.toronto.edu/~yiannac/docs/raaw06.pdf>>, Retrieved Date: Jul. 15, 2011, pp. 10.

Riesen, "Dynamic Code Generation", Retrieved at <<http://www.cs.unm.edu/~riesen/prop/node35.html>>, Retrieved Date: Jul. 14, 2011, p. 1.

Yu, Pan., "Design Methodologies for Instruction-Set Extensible Processors", Retrieved at <<http://scholarbank.nus.edu.sg/bitstream/handle/10635/15915/PanYuThesis.pdf?sequence=1>>, 2008, pp. 162.

Hollingsworth, et al., "MDL: A Language and Compiler for Dynamic Program Instrumentation", Retrieved at <<http://ieeexplore.ieee.org/stamp/stamp.jsp?tp=&arnumber=644016>>, International Conference on Parallel Architectures and Compilation Techniques, Nov. 10-14, 1997, pp. 201-212.

Floriano, et al., "The Annotated Test Step Pattern", 2011 ACM; [retrieved on Sep. 30, 2014]; Retrieved from Internet <URL:http://dl.acm.org/citation.cfm?id=2578903>;pp. 4-13.

Coelho, et al., "Unit Testing in Multi-agent Systems using Mock Agents and Aspects"; ACM; [retrieved on Sep. 30, 2014]; Retrieved from Internet <URL:http://dl.acm.org/citation.cfm?id=1138063>;pp. 83-89.

Kim, et al., "Mock Object Models for Test Driven Development"; 2006 IEEE;[retrieved on Sep. 30, 2014]; Retrieved from Internet <URL:http://ieeexplore. ieee.org/stamp/stamp.jsp?tp=&arnumber=1691384>;pp. 1-8.

Tilmann, Schulte, "Mock-object generation with behavior", 2006, IEEE; [retrieved on Sep. 30, 2014]; Retrieved from Internet <URL:http://ieeexplore.ieee.org/stamp/stamp.jsp?tp=&arnumber=4019611 >;pp. 1-2.

Jefferies, "Virtual Mock Objects using AspectJ with JUNIT"; 2002, xprogramming.com; [retrieved on Dec. 19, 2013]; Retrieved from Internet <URL:xprogramming.com/articles/virtualmockobject/virtualmockobjects/>;pp. 1-5.

Hunt, Brubacher, "Detours: Binary Interception of Win32 Functions"; 1999, Proceedings of the 3rd US EN IX Windows NT symposium; [retrieved on Oct. 12, 2012]; Retrieved from Internet <URL: http://research.micorsoft.com/pubs/68568/huntusenixnt99.pdf>; pp. 1-9.

Hunt, Scott, "Intercepting and Instrumenting COM Applications"; 1999, 5th USENIX Conference on Object-Oriented Technologies and Systems; [retrieved on Oct. 12, 2012]; Retrieved from Internet <URL: http://cs.rochester.edu/u/scott/papers/1999_COOTS.pdf>; pp. 2-13.

Sokenou, Vosgen, "FlexTest: An Aspect-Oriented Framework for Unit Testing", 2005, Springer-Verlag Berlin; [retrieved on Oct. 15, 2012]; Retrieved from Internet <URL:http://www.springerlink.com/content/1 rmchet0n531ngyj/fulltext.pdf>; pp. 257-270.

Chiba, Shigeru, "Javassist: Java Bytecode Engineering Made Simple", Retrieved at<< http://java.sys-con.com/node/38672 >>,Jan. 8, 2004, pp. 7.

Weisfeld, Matt,"Java Language Integrity & Security: Fine Tuning Bytecodes",Retrieved at<< http://www.2 developer. com/design/article.php/3669651/Java-Language-Integrity--Security-Fine-Tuning-Bytecodes. htm >>, Apr. 4, 2007, pp. 5.

"Serp", 2007, Retrieved at<< http://serp.sourceforge.net/>>,pp. 4.

"Rhino Mocks", Retrieved at<< http://ayende.com/projecls/rhinomocks.aspx >>,pp. 2. Retrieved Mar. 29, 2010.

"Moq", Retrieved at<< http://code.google.com/p/moq/ >>,pp. 4. Retrieved Mar. 29, 2010.

Office Action for U.S. Appl. No. 12/748,469 mailed Oct. 25, 2012 (26 pages).

Office Action for U.S. Appl. No. 12/748,469 mailed Apr. 10, 2013 (24 pages).

Office Action for U.S. Appl. No. 12/748,469 mailed Aug. 20, 2013 (28 pages).

Office Action for U.S. Appl. No. 12/748,469 mailed Jan. 2, 2014 (20 pages).

Office Action for U.S. Appl. No. 12/748,469 mailed Jun. 16, 2014 (24 pages).

Notice of Allowance for U.S. Appl. No. 12/748,469 mailed Oct. 7, 2014 (13 pages).

* cited by examiner

PROCESS FOR GENERATING DYNAMIC TYPE

BACKGROUND

Types and type systems are ubiquitous aspects of computer programming although different languages may use different terminology. A type is a classification of data and assigning a type gives meaning to a sequence of bits. A sequence of bits does not, by itself, provide a distinction between memory addresses, instruction code, integers, floating point numbers, characters, and other purposes for the sequence. Associating a sequence of bits with a type informs computer programs how that sequence of bits should be understood. Other entities, such as objects, modules, communication channels, dependencies, or even types themselves, can become associated with a type.

A type system may be defined as "a tractable syntactic framework for classifying phrases according to the kinds of values they compute." A type system associates a type with each computed value and includes a set of rules or constraints for the type. A particular type system determines what constitutes a type error. In general, one aim of the type system is to prevent operations expecting a certain kind of value being used with values for which that operation does not make sense. Type systems are often specified as part of programming languages—and built into the interpreters and compilers for them—although they can also be implemented as optional tools.

The process of verifying and enforcing type constraints, often referred to as type checking, may occur either at compile-time or run-time. A programming language uses static typing when type checking is performed during compile-time as opposed to run-time. Static typing is a limited form of program verification, and it allows many type errors to be caught early in the development cycle. Static type checkers evaluate the type information that can be determined at compile time, but are able to verify that the checked conditions hold for further possible executions of the program. Applications created with static languages can be made more efficient, such as faster execution and/or taking reduced memory, by omitting runtime type checks and enabling other optimizations.

A programming language is dynamically typed when the majority of type checking is performed at run-time. Values in dynamic typing have types but variables do not, and a variable can refer to a value of any type. In one example, dynamic languages make excellent scripting languages. Applications created with dynamic languages can be relatively easily extended with new commands and functionality. Dynamic languages are also frequently used for creating Web sites and test harnesses, maintaining server farms, developing various utilities, and performing data transformations.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Emitting code at runtime for dynamic types is currently difficult, time consuming, and error prone. Currently, developers manually write a procedure that outputs a sequence of instructions and arguments in a low level language, which is then compiled into an assembly. Instead of dynamically generating code as described, the disclosure describes a process that reads instructions from a method that has been previously compiled within the assembly and emits those instructions instead. Dynamic code is generated when the previously compiled method is cloned, during which, custom code is injected into the cloned code to alter the behavior of the previously compiled method.

The disclosure is directed to a process for generating dynamic type. A compiler generated template method including a mark for custom instruction is selected for cloning. Dynamic code is injected at the mark for the custom instructions. The template method including the injected dynamic code is compiled.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
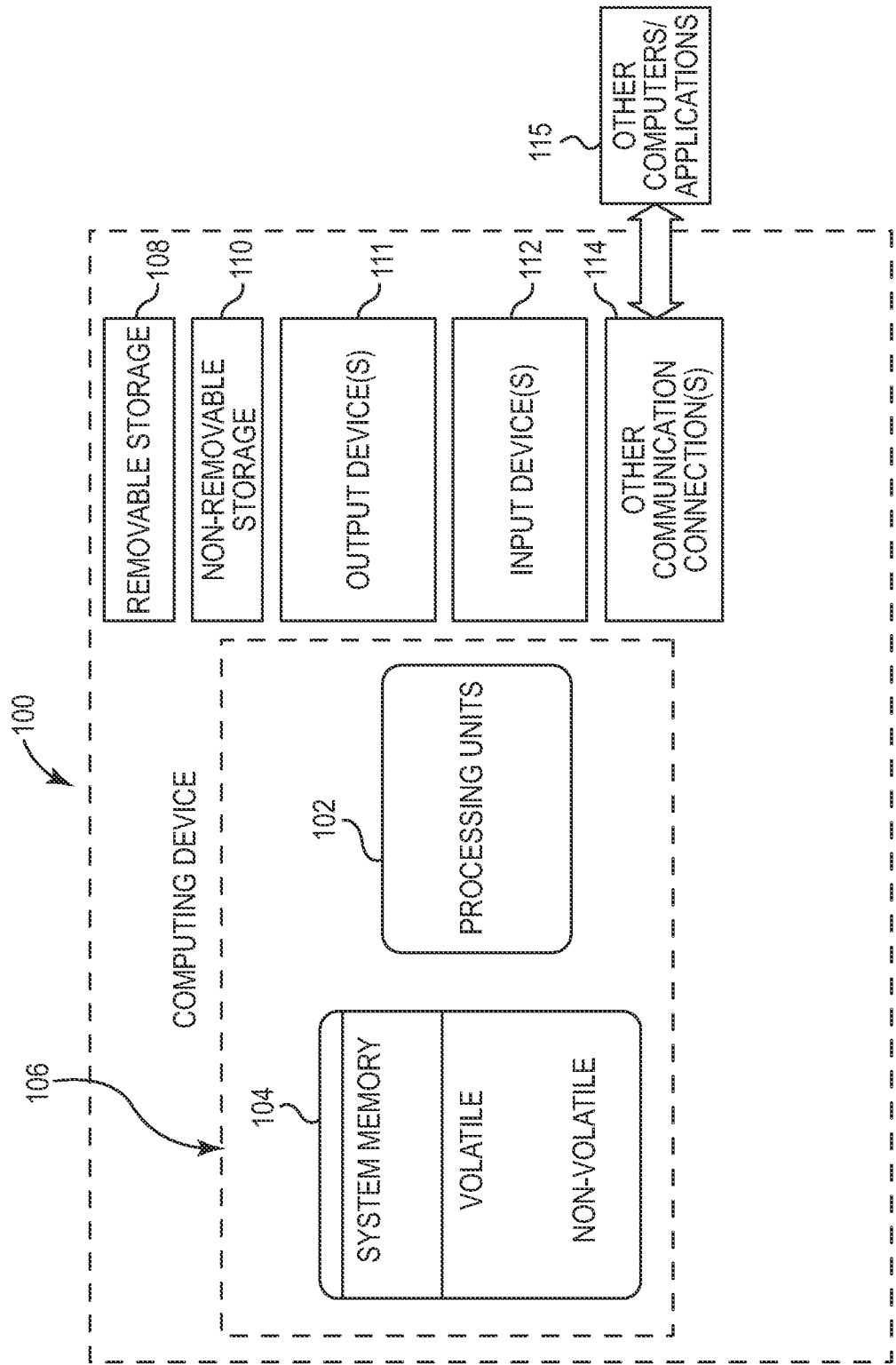
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process of generating dynamic types. The computer system can also be used to develop and/or run computer applications having processes of generating dynamic types.

The exemplary computer system includes a computing device, such as computing device 100. In a basic configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

The computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

In one example, the computing device 100 includes a software component referred to as a managed environment. The managed environment can be included as part of the operating system or can be included later as a software download. Typically, the managed environment includes pre-coded solutions to common programming problems to aid software developers to create applications, such as software programs, to run in the managed environment. Examples of managed environments can include an application framework or platform available under the trade designation .NET Framework from Microsoft Corporation of Redmond, Wash. U.S.A, and Java now from Oracle Corporation of Redwood City, Calif., U.S.A., as well as others and can include web application frameworks often designed to support the development of dynamic websites, web applications and web services.

Figure 2:
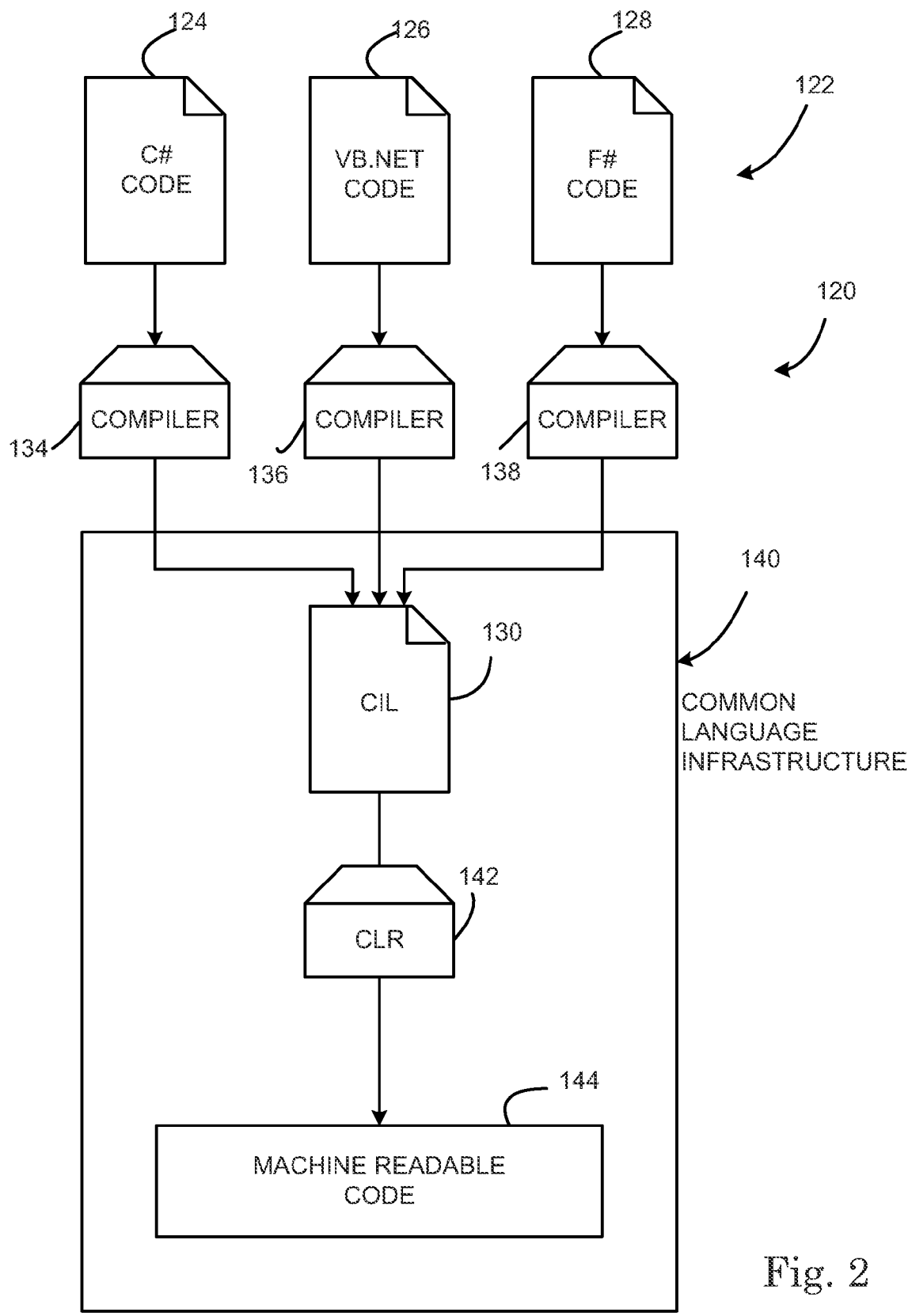
FIG. 2 is a block diagram illustrating an example of a managed environment for a computer application running on the computing device of FIG. 1.

FIG. 2 illustrates an example of a managed environment 120 suitable for operation with the computing device 100. The managed environment 120 is configured to accept programs written in a high-level compatible code of one or more programming languages 122 to be used on different computer platforms without having to be rewritten for specific architectures. For example, the managed environment can accept programs written in compatible programming languages such as C# (C-sharp) code 124, a visual basic type language such as one available under the trade designation Visual Basic .NET, or VB.NET, code 126 (now available under the trade designation to as Visual Basic), and several other languages, for example F# (F-sharp) code 128.

Typically, each program written in a compatible language will be compiled into a second platform-neutral language 130—with corresponding language-specific compilers 134, 136, 138, respectively—within a Common Language Infrastructure (CLI) 140. In general, the second platform-neutral language is referred to as an intermediate language, or IL. In the case of the .NET Framework, the second platform-neutral language 130 is often referred to as the Common Intermediate Language (CIL), and the language compilers 134, 136, and 138 emit the CIL. A development tool, such as an IL disassembler, can be used to inspect the second platform-neutral language. The program in the second platform-neutral language 130 is provided to a runtime compiler 142, such as one available under the trade designation Microsoft Common Language Runtime (CLR) in the .NET Framework, that compiles the program in the second platform-neutral language 130 into a platform-specific machine-readable code 144 that is executed on the current platform or computing device. Other managed environments or other implementations could facilitate the execution of the second platform-neutral language 130 other than with the runtime compiler 142 such as with interpretation or another method, or with a combination of the two or more methods.

The example of a managed environment 120 can also include a dynamic language runtime, in one example, as part of the runtime compiler 142. The dynamic language runtime (DLR) is a runtime environment that adds a set of services for dynamic languages to the common language runtime (CLR). The DLR provides additional support to develop dynamic languages to run on the .NET Framework and to add dynamic features to statically typed languages. The DLR also enables a system of dynamic languages to run on and have interoperability in the .NET Framework. The DLR introduces dynamic objects to C# and Visual Basic in a development tool such as one available under the trade designation Visual Studio 2010 from Microsoft Corp. to support dynamic behavior in these languages and enable their interoperation with dynamic languages. The DLR also helps developers create libraries that support dynamic operations. For example, in a library that uses Extensible Markup Language (XML) or JavaScript Object Notation (JSON) objects as well as others, the objects can appear as dynamic objects to languages that use the DLR. This provides library users with an ability to write syntactically simpler and more natural code for operating with objects and accessing object members.

Emitting code for dynamic types, however, is currently very difficult, error prone and time consuming. Currently, developers manually write a procedure that outputs a sequence of instructions and arguments in IL, instead of a high level language such as C#, which are then compiled into an assembly. This process does not take advantage of a compiler, and so it is equivalent to writing code in assembly. As a result, it is very difficult to emit complex functions at runtime using dynamic code generation, and even harder to make changes to this code once the emitting procedure has been developed. Thus, while dynamic types provide advantages and/or alternatives to static types, generating dynamic code remains cumbersome and susceptible to developer error.

Figure 3:
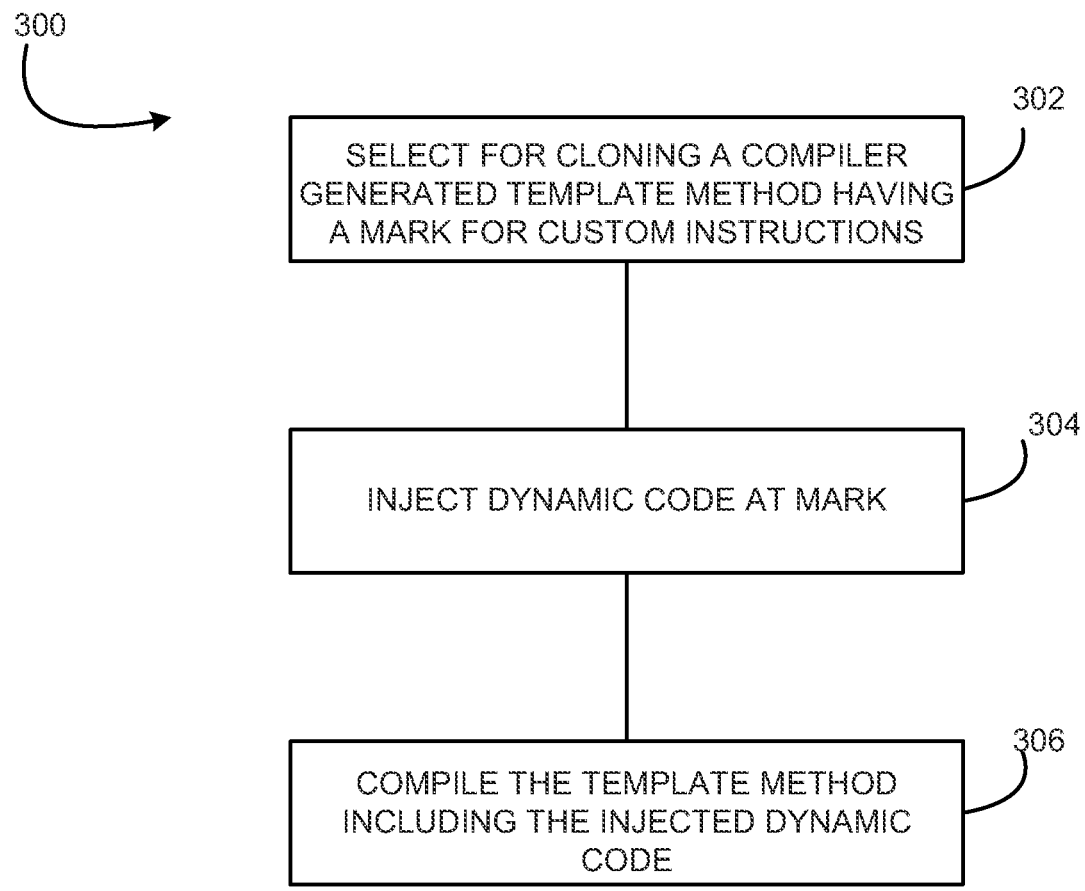
FIG. 3 is a block diagram illustrating an example process of generating a dynamic type with the computing device of FIG. 1.

FIG. 3 illustrates a process for generating dynamic types 300 that reduces both complexity and errors over current methods of emitting codes for dynamic types. Instead of dynamically generating code as described above, the process 300 reads instructions from a method that has been previously compiled within the assembly and emits those instructions instead. Dynamic code is generated when the previously compiled method is cloned, during which, custom code is injected into the cloned code to alter the behavior of the previously compiled method. The emitted code, including the injected custom code, is compiled. Often, the injected code is only a fraction of the cloned code, which provides the opportunity to reduce errors at runtime.

A method is generally understood to be a subroutine associated with a class. A subroutine, also referred to as a procedure, function, routine, method, or subprogram, is a portion of code that can be used in a larger program such as to perform a specific task. Methods can be relatively independent of the larger program. Methods define the behavior to be exhibited by instances of the associated class at run time of the program.

A class is a construct that is used as a blueprint to create instances of itself, which is often referred to as class instances, class objects, instance objects or simply objects. A class defines constituent members that enable these class instances to have state and behavior. At run time, methods have access to data stored in an instance of the class they are associated with and are able to control the state of the instance. The association between class and method is called binding, and a method associated with a class is often referred to as being "bound" to the class. Methods can be bound to a class at compile time, which is often referred to as static binding, or to an object at runtime, which is often referred to as dynamic binding.

Referring to FIG. 3, process 300 selects a template method for cloning at 302 where the template method has been previously compiled. For example, the process 300 selects a type-checked template method having roughly a similar sequence of instructions as the desired dynamic type being generated. The desired dynamic type will include variations to the original code of the template method depending on particular circumstances such as the number and type of arguments. Simply cloning the original instructions of the selected template method does not generate the desired dynamic type because the template method has not been customized for the particular circumstance.

The template method also includes a mark in the original instructions to indicate a location for customized instructions at 302. Dynamic code for the particular circumstance of the method is injected into the original code at the mark for the customized instructions at 304. For example, rather than emitting the original instructions at the mark, a procedure can be called to inject the dynamic code. The original code from the template method as well as the injected dynamic code is compiled at 306.

The process 300 selects and clones the template method at 302. In one example, a template method is defined, or created, and is compiled into the application. An application can include several different template methods or several similar template methods that are to be configured for different circumstance. The template method can be particularly created for the application, but examples are contemplated where the template method selected from a repository of generic template methods. The selected template method includes bytecode to be copied. Bytecode is a term for instruction sets designed for efficient execution by a software interpreter as well as being suitable for further compilation into machine code.

A cloning procedure, such as one available as part of the managed environment or the development tool, is enlisted to begin cloning the original instructions of the selected template method. The original instructions, which were compiler generated, are extracted from the template method. In the .NET Framework, the cloning procedure converts the instructions into a stream of IL OpCodes (operation codes) and CLR objects that can then be emitted using the Reflection.Emit application programming interface (API). The cloning procedure can also keeps track of data such as labels for break statements, as well as try/catch statements, and the like. This provides for the cloning procedure to emit dynamic methods without having to keep track of low-level instructions directly and allows the dynamic methods to take advantage of the compiler-produced byte code.

The template method includes a mark in the original instructions to indicate the location for customized instructions at 302. Custom instructions are injected at the mark instead of the original code such as by calling a patching procedure. When the cloning procedure is emitting code, each instruction is checked to determine whether it has been marked for a patch. If the instruction has been marked for a patch, then instead of emitting the original instruction, the cloning procedure calls the patching procedure. The patching procedure then manually emits a small block of custom code that depends on the context of the dynamic type.

In one example of injecting dynamic code at selected points in the template method at 304, the template method includes embedded calls to a static generic method in a class called "Patcher". As an example, the following statement:

Patcher.PatchWithNoReturnValue<CallBaseMethod-Patch>( );

can be used to patch the template with dynamic code that calls a base class method at the location of the template method where the behavior is to be altered.

As the cloning procedure iterates over the bytecode of the template method, it looks for instructions that call static generic methods on the patcher class. One advantageous reason to use static generic methods to mark locations for the custom code is because the above statement compiles into a single instruction in IL. When the cloning procedure finds calls to the Patcher class, it inspects the generic arguments of the method call to determine the name of the Patcher class to call. In the example above, this patch is called CallBaseMethodPatch. The cloning procedure then instantiates an instance of the patch and calls it, passing it the context of the cloning procedure. The patch is then able to inject dynamic code at a particular point in the IL stream that is independent of what the compiled template produced.

The process 300 includes several advantages over other code generating solutions, and a few of the advantages are set out here. Without the template method, a developer manually generates the dynamic code for an entire method in order to get the desired customization. In process 300, however, the developer can split the code generation up across multiple patches, which can be re-used in multiple templates. Instead of having to procedurally generate the entire method, the compiler generates the majority of the template method and augments it with custom patches. This eliminates much of the complexity from the process of generating dynamic methods and makes for easy to change to the template and thus the generated types. The patches can be easily tested because they produce small, targeted blocks of code that can be verified independent of a template.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A process for generating dynamic type code, comprising:
    selecting a compiler generated type-checked template method for cloning having roughly a similar sequence of instructions as the dynamic type code to be generated, the compiler generated type-checked template method including a mark for custom instructions;
    injecting dynamic code at the mark for custom instructions in the compiler generated type-checked template method to generate the dynamic type code;
    wherein the generated code includes variations to the original code of the template method by the number and types of arguments; and
    compiling the generated code.

2. The process of claim 1 wherein template method is compiled into an application.

3. The process of claim 2 wherein the application includes a plurality of template methods.

4. The process of claim 1 and further comprising cloning original instructions of the template method.

5. The process of claim 4 wherein cloning includes converting the original instruction into a stream of instruction language operation codes and objects.

6. The process of claim 4 wherein cloning the original instructions of the template method includes checking instructions for the mark.

7. The process of claim 6 wherein checking instructions includes checking each instruction emitted during cloning.

8. The process of claim 6 wherein custom instructions are injected instead of the original instructions at the mark.

9. The process of claim 8 wherein the custom instructions are injected with a patching procedure.

10. The process of claim 8 wherein the emitted original instructions of the template method and custom code are compiled.

11. The process of claim 1 wherein compiling includes compiling original instructions emitted during cloning and the dynamic code.

12. A process for generating dynamic type code, comprising:
    emitting original instructions of a selected compiler-generated type-checked template method template having roughly a similar sequence of instructions as the dynamic type code to be generated and having a mark for injecting custom instructions; and
    calling a procedure to inject dynamic code in the context of the dynamic type at the mark for custom instructions in the compiler generated type-checked template method to generate the dynamic type code rather than emitting original instructions at the mark, wherein the generated code includes variations to the original code of the template method by the number and types of arguments.

13. The process of claim 12 and further comprising compiling the emitted original instructions and the dynamic code.

14. The process of claim 12 wherein the emitting original instruction is performed with a cloning procedure.

15. The process of claim 12 and further comprising checking the original instruction for the mark prior to emitting the original instructions.

16. The process of claim 12 wherein the template method includes embedded calls to the procedure.

17. The process of claim 16 wherein the procedure is a static generic method.

18. The process of claim 12 wherein the procedure emits a small block of custom code that depends on the context of the dynamic type.

19. A process for generating dynamic type code comprising:
    selecting a compiler generated type-checked template method within an application, the type-checked template method having roughly a similar sequence of instructions as the dynamic type code to be generated, the type-checked template method including original instructions and an embedded call to a patching procedure emitting the original instructions;
    injecting custom instructions with the patching procedure instead of cloning the embedded call to generate the dynamic type code, wherein the generated code includes variations to the original code of the template method by the number and types of arguments; and compiling the generated code at runtime.

20. The process of claim 19 wherein the patching procedure emits a block of custom code that depends on the context of the dynamic type.

* * * * *